US010657539B2

(12) United States Patent
Forbes et al.

(10) Patent No.: US 10,657,539 B2
(45) Date of Patent: May 19, 2020

(54) DIGITAL VOICE COMMUNICATION ADVERTISING

(75) Inventors: Scott C Forbes, Redmond, WA (US); Jerald J Gnuschke, Woodinville, WA (US); Tim M Moore, Bellevue, WA (US); Dawson Yee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2212 days.

(21) Appl. No.: 11/771,483

(22) Filed: Jun. 29, 2007

(65) Prior Publication Data

US 2009/0006193 A1  Jan. 1, 2009

(51) Int. Cl.
| | | |
|---|---|---|
| G06Q 30/02 | (2012.01) | |
| G06Q 20/10 | (2012.01) | |
| G06Q 40/04 | (2012.01) | |

(52) U.S. Cl.
CPC .......... *G06Q 30/02* (2013.01); *G06Q 20/102* (2013.01); *G06Q 30/0256* (2013.01); *G06Q 30/0269* (2013.01); *G06Q 30/0275* (2013.01); *G06Q 30/0277* (2013.01); *G06Q 30/0283* (2013.01); *G06Q 40/04* (2013.01)

(58) Field of Classification Search
USPC ........................................................ 705/14
See application file for complete search history.

(56) References Cited

U.S. PATENT DOCUMENTS

| | | |
|---|---|---|
| 6,606,644 B1 | 8/2003 | Ford et al. |
| 7,103,563 B1 | 9/2006 | Voisin et al. |
| 7,133,513 B1 * | 11/2006 | Zhang ...................... 379/202.01 |
| 7,925,610 B2 * | 4/2011 | Elbaz et al. .................... 706/55 |
| 2002/0095296 A1 * | 7/2002 | Hind et al. .................... 704/500 |
| 2002/0133404 A1 | 9/2002 | Pedersen |
| 2003/0009331 A1 * | 1/2003 | Schalkwyk et al. .......... 704/237 |

(Continued)

FOREIGN PATENT DOCUMENTS

| | | |
|---|---|---|
| WO | WO0163512 A1 | 8/2001 |
| WO | WO0201840 A1 | 1/2002 |

(Continued)

OTHER PUBLICATIONS

Anupam, et al., "Personalizing E-commerce Applications with On-line Heuristic Decision Making", available at least as early as Jan. 9, 2007, at <<http://delivery.acm.org/10.1145/380000/372073/p296-anupam.pdf?key1=372073&key2=2297138611&coll=GUIDE&dl=GUIDE&CFID=8592780&CFTOKEN=98779598>>, ACM, 2001, pp. 296-307.

(Continued)

*Primary Examiner* — Anita Coupe
*Assistant Examiner* — Darnell A Pouncil
(74) *Attorney, Agent, or Firm* — Schwegman Lundberg & Woessner, P.A.

(57) ABSTRACT

Techniques for providing third party incentivized communications sessions are described. In some embodiments, a Voice over IP (VoIP) conversation is sampled for audio information such as a word, phrase, utterance, or phoneme that may be associated with an advertisement in a database. The database may be searched for the audio information, or in some embodiments a text equivalent of the audio information, and the associated advertisement may be served to a participant in the VoIP communication session. In some implementations, data from or about the conversation may be compiled for analysis.

19 Claims, 6 Drawing Sheets

(56) References Cited

U.S. PATENT DOCUMENTS

| | | | |
|---|---|---|---|
| 2003/0126013 A1 | 7/2003 | Shand | |
| 2004/0139318 A1* | 7/2004 | Fiala et al. | 713/165 |
| 2004/0186777 A1 | 9/2004 | Margiloff et al. | |
| 2005/0283464 A1* | 12/2005 | Allsup et al. | 707/3 |
| 2006/0149625 A1 | 7/2006 | Koningstein | |
| 2006/0184800 A1* | 8/2006 | Rosenberg | 713/186 |
| 2007/0078708 A1* | 4/2007 | Yu et al. | 705/14 |

FOREIGN PATENT DOCUMENTS

| | | |
|---|---|---|
| WO | WO0225624 A1 | 3/2002 |
| WO | WO2006069445 A1 | 7/2006 |

OTHER PUBLICATIONS

Bulander, et al., "Comparison of Different Approaches for Mobile Advertising", available at least as earl as Jan. 9, 2007, at <<http://ieeexplore.ieee.org/iel5/10558/33407/01581590.pdf?tp=&arnumber=1581590&isnumber=33407>>, IEEE, 2005, pp. 1-9.

Hristova, et al., "Ad-me: wireless advertising adapted to the user location, device and emotions", available at least as early as Jan. 9, 2007, at <<http://ieeexplore.ieee.org/iel5/8934/28293/01265673.pdf?tp=&arnumber=1265673&isnumber=28293>>, IEEE, 2004, pp. 1-10.

* cited by examiner

300

---

DATA  — □ x

File  Edit  Actions  Tools  Help

[Location ▼] [Word ▼] [Bid ▼]  DETAIL  [Other Words ▼] [Record ▼]
[Relevancy ▼] [Time ▼] [Settings ▼]  SELECT  [Client Profile ▼] [Ad Level ▼]

RECORD 1                                   TRUCK

Related Words:
  Purchase, Dealer, New, Full-sized
Location:
  Seattle WA 98051
Call Time:
  4:00 p.m.
Duration:
  10.2 minutes
Interaction: Level: 6.1
      Clicked Ad
      Accessed Dealer Link
      Average Time: 45 sec/page
      Forwarded Ad to Participant 2
Speaker:
  Participant 2
Relevancy: 8.5 (high)
Identity: Work
 Participant 1 (Level: High)
  Male
  Age 25-30
  Residence: Suburban Seattle 98052
  Income: $60-70,000
 Participant 2 (Level: Low)
  Female
  Age 20-25
  Residence: Dayton 45435
  Income: $35-40,000

---

QUICK FACTS:

Average Ad Time: 14 second            Ad Presented: 12,622
Average Interaction Level 3.5         Ad Cycle: March-April
Average Location: Mid West Surban/Rural
Income Level: $50,000
Ave. Related Words: pickup, used, repair March 24, 2007

PARTICIPANT

File  Edit  Actions  Tools  Help

RECORD FOR: (625) 555-1212

402

PROFILE: DETAILS

Participation Level: High

Restrictions: Adult Alcohol, Tobacco

Data Retention: No

Minor Accessible: No

Personal Information: No

Personal Information Level Low

Advertiser Contact: Yes

Identity(s): Home Only

Computer Only: Yes

Sampling Rate: Medium

Ad Type: Email, Pop-up Voice Mail

404

INCENTIVES:

Enrolled: Silver VoIP
Message: Congratulations! You qualify for a new modem. Call 555-1212 for delivery.

Change:

Reward Points: 21,214

Redeem Points Now

DIGITAL VOICE COMMUNICATION ADVERTISING

BACKGROUND

Communication service providers, such as telephone service providers, generally charge their customers a predetermined fee for using the communication service. Customers might pay a monthly subscription fee, such as the monthly telephone or cable television bill. Alternatively, customers might pay a per-use fee, such as at a public pay-phone or a pre-paid cellular telephone. Regardless of the type of communication service, subscription or per-use fees have traditionally been the most common payment method for provision of communication services. Although the initial investment used to create the infrastructure for most communication networks has long been recouped, communication services cannot be provided for free due to various reasons such as taxes, regulatory fees, site rental for equipment (e.g., cellular towers), and ongoing maintenance costs.

SUMMARY

Among other innovations disclosed in more detail below, some techniques and systems for analyzing the content of audio and/or multimedia communications and providing content relevant to at least some portion of the communications. Some innovative methods and systems for providing advertisements relevant to voice communications are also described. Also disclosed are various methods and systems for subsidizing communication services and/or incentivizing communication activities. In one embodiment, a digital audio conversation is sampled or searched for a word, sound, phoneme, or utterance associated with an advertisement in a database. The database may be searched for the word and an associated advertisement may be served to one or more participants in the digital audio conversation. In some embodiments, different advertisements may be displayed to each participant in the communication session. The advertisements may be selected based on location (e.g., as determined by ANI, GPS, latitude/longitude, account records, billing records, etc.), device capability (e.g., no display, small display, processor speed), communication bandwidth, and/or participant history and preferences (e.g., some participants may prefer to have content emailed to them, some may prefer to see it on the screen of their computer in real-time, etc.). In some embodiments, data from the conversation may be compiled for analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is an illustration of an exemplary data webpage user interface.

FIG. 4 is an illustration of an exemplary participant webpage user interface including a profile portion.

DETAILED DESCRIPTION

Overview

Figure 1:
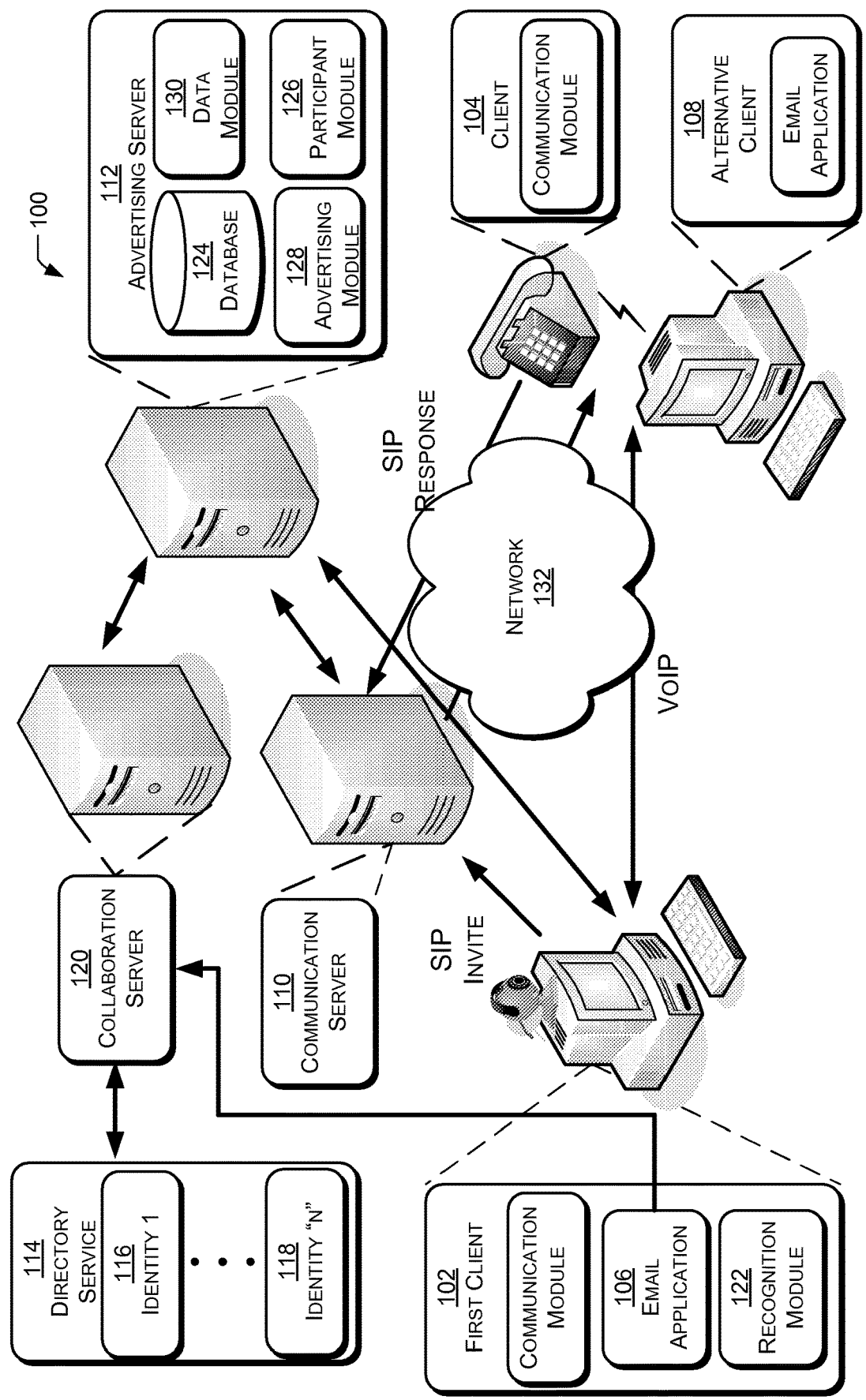
FIG. 1 is an illustration of an environment for providing third party subsidized or incentivized communications.

Among the innovations disclosed are computer-implemented techniques for providing third party subsidized/incentivized digital and/or analog voice communications. For ease of explanation, the description will focus primarily on digital voice communications such as Voice over IP (VoIP) but analog voice communications can benefit from the methods and systems described. According to some of these techniques, participants in digital audio events are served advertisements, such as solicitations and/or information from a third party to the conversation, based on words or utterances included in the digital audio event. For example, in response to detecting the utterance in a digital audio event, a database may be searched for an advertisement associated with the utterance. In this manner, clients may be served advertisements, in real-time or at a later time, based on words and/or combinations of words that occur in a digital audio event. (Words, utterances, phonemes, and sounds are some types of audio information that may be extracted from audio communication sessions and used in the various embodiments described. For clarity, generally only one of those terms is used but it is understood that the others may be substituted where appropriate.) In some implementations, the advertisements may be forwarded to an associated email, Instant Message (IM), or voicemail account so that the advertisement does not intrude in the digital audio event. For example, advertisements may be provided in alternate media formats with the served advertisement being selected without directed user interaction.

Additionally, a third party may be assessed a fee customized in accordance with how well the participant matched a target for the advertisement. Thus, third party payments or billings may reflect the value of the advertisement from the third party's perspective (e.g., how well the participant matched a target audience). In this fashion, the digital audio service provider may tailor the assessed advertising fee based on factors which reflect the accuracy of the advertisement for the targeted participant. In some embodiments, the advertising fee may reflect a base charge for presentation of the advertisement, a "click-through" charge if the recipient clicks on a web-based advertisement, a "voice-through" charge if the recipient responds to an audio advertisement (e.g., the audio ad may ask "Say 'Yes' if you want to call the advertiser now", and automatically place a phone call to the advertiser upon an affirmative response), or a percentage of the subsequent transaction. In one embodiment, an advertisement web page is displayed on the computer screen of a client computer having a VoIP application and a voice browser. The advertisement web page may be rendered in HTML and a voice markup language such as Voice XML. A call-through may be automatically triggered when the computer-user says a keyword or phrase associated by the web page with the action of placing a VoIP call to a phone number or other destination specified by the advertisement web page.

In further implementations, various techniques may be used for determining the third party source of the advertisement. For example, potential advertisers may engage in an online bidding environment for keywords (or phrases, utterances, phonemes, etc.) or select available words provided via a user interface such as a webpage.

Data associated with an audio event may be compiled for analysis. Some examples of data associated with an audio event are time, duration, quality of service (QoS), keywords, frequency, participant information, etc. For example, a user interface for managing user information, utterances, and advertising information may be provided.

In the following discussion, an exemplary environment is first described that is operable to implement incentivized audio communication sessions. Exemplary procedures are then described that may be employed in the exemplary environment, as well as in other environments.

Exemplary Environment

FIG. 1 is an illustration of an environment 100 in exemplary implementations employing a system configured to forward advertisements based on utterances within a digital audio session. For example, a participant may agree to accept advertisements, such as solicitations or information, in exchange for receiving incentives. Incentives may include free or reduced communication services, communication hardware devices, coupons, reimbursements, fungible credits and so on.

In described implementations, a first participant and a second participant may engage in a digital audio session or conversation using a first client 102 and a second client 104. While the digital audio session may be initiated by one of the participants placing a digital telephone call to the other client, in other instances the digital audio session may be escalated from another communication medium (such as email or IM) or the call may be transferred from another client. For example, the participants may switch from instant messaging to a voice over internet protocol (VoIP) session or may initiate an audio conversation after exchanging emails using an email application 106 (such as OUTLOOK, Microsoft Corporation, Redmond, Wash.) that has a "click to call" or similar functionality on email messages. In some embodiments, additional clients may be included as well. For example, the digital audio session may be a "broadcast" (e.g., multicast) or a conference call in which several participants may join but not actively participate.

Moreover, clients may encompass computers having audio functionality, mobile phones, cellular phones, smart phones, VoIP phones and the like having audio capability. In further instances, other devices may be used in conjunction with a primary device. For example, if a primary device does not include a monitor, a related computer 108 having a monitor may be forwarded advertisements. The system may choose to which device to forward the advertisement based on the participant's presence status (e.g., available, do not disturb, away, busy, etc.) on the various devices associated with the device from which the audio communication session is initiated. The participant may specify the medium (e.g., media format) in which he/she would like to receive advertisements. Exemplary mediums may include, but are not limited to, video display, real-time video display, instant messaging, email messaging, voice mail, forwarding an Internet (a World Wide Web) link, a subsequent digital telephone call, an offer to place a communication (e.g., a phone call asking "Would like to call the third party?"), physical messaging (such as a piece of physical mail sent to the participant) and so on.

In some embodiments, the first client 102 may initiate the digital audio session using a session initiation protocol (SIP) invite or other signaling protocol for establishing voice communication with the other clients. The SIP invite may be routed through a communication server 110 which acts as an intermediary for signaling purposes, while conversation content may be transferred between the clients. For example, real-time communications may be facilitated by a unified communication platform, such as a server operating in accordance with Microsoft Office Communications Server 2007 (Microsoft Corporation, Redmond Wash.) for facilitating communication and so on.

The SIP invite may include a variety of parameters for "negotiating" the communication session. The SIP invite may be sent to the target client, in this case the second client 104, which may return a SIP response for determining various digital audio session parameters. For instance, the first client 102 may receive the SIP invite from the communication server 110 thereby establishing a VoIP session between the first client 102 and the second client 104. For example, the first client 102 and the second client 104 may communicate over the Internet, whereby digital audio content packets are transferred between the clients. During the session, the communication server 110 may be used for SIP signaling such as maintaining the session, joining additional clients, terminating the session and the like.

If, for example, the first client 102 (or other clients in the digital audio session) is configured to accept third party communications (such as advertisements), an advertising server 112 may join in the session or provide content related to the session. For example, the advertising server 112 may be included if the first participant (associated with the first client) has previously enrolled in a program in which the participant receives advertisements. The advertising server 112 may join in a similar manner as the first and second clients. In other instances, a separate communication link may be established between the first client 102 and the advertising server 112. This first client 102/advertising server 112 session may be SIP initiated. The particular communication schema employed may depend on design preferences, participant preferences and regulatory conditions.

In one embodiment, keyword detection can be performed on either or both halves of a two-party conversation. For instance, if the first client 102 resides in a jurisdiction in which the first participant notifies the other participants if the advertising server 112 has access to the other participant audio, a separate communication link may be established between the first client 102 and the advertising server 112 so that the advertising server 112 receives outbound first client 102 audio data but does not receive inbound audio data from second client 104. In the previous example, the communication server 110 may make this determination based on the area code/prefix to which the call is placed, the billing address associated with ANI, latitude/longitude information (e.g., derived from GPS, RF triangulation, etc.), the physical address associated with an internet protocol (IP) address of the device being signaled, target participant information, whether digital audio session data is retained, the extent of sampling, and so on. In some embodiments, the second participant (associated with a second client) may receive a notification regarding the role of the advertising server 112. For example, the signaling client may provide an audio, graphical, or text message such as "This call implements a service which advertises based on subject matter occurring in conversations, but no data is retained", if the call is placed to a jurisdiction in which the caller is to notify the recipient. Other suitable messages may be provided as well. In some implementations, a participant may be prompted to "opt-in" or "opt-out" by providing an input such as pressing a key on a telephone or the like. In some embodiments, a participant may opt-out of having his side of a conversation sampled but still opt-in to receive content (e.g., advertisements, etc) relevant to another participant's side of the conversation that is being sampled.

The type of information passed from the client to the network, and the routing of the information through the network, may vary depending upon the embodiment. For example, some embodiments may pass the unprocessed audio samples, some may perform some pre-processing before passing the audio sample, some may perform speech to text processing and only pass keywords, etc. In some embodiments, network elements (e.g., servers, gateways, routers, etc.) may intercept the audio stream and then pass it to the intended recipient. In some embodiments, the system may set up a parallel audio content delivery path: the clients exchange audio content between themselves but a copy of the audio content is routed to the network's speech recognition system. In some embodiments, the client device will have an on-board speech recognition system or speech to text (STT) system. If so, the client may determine the sampled keyword and pass it in text form to the network for processing and advertisement service.

Several billing variations are supported by the "opt-in/opt-out" scenario. For example, if a communication session participant opts-out of having his conversation sampled and/or receiving advertisements (thus, opting out of the advertisement-supported session payment method), then billing for all or a portion (e.g., 50% or pro rata share of a multi-party session) of the costs of the communication session may revert to the participant who opts-out.

Similarly, the geopolitical jurisdiction or geographic location of the party being called may be considered when determining whether to sample and/or provide content. Techniques for making this determination, and similar determinations as discussed above, may include, but are not limited to, comparing the area code/prefix with a directory including regulatory schemes, using global positioning systems or other methods of determining lat/long (for instances involving mobile/cellular phones, etc.), determining physical addresses of internet protocol (IP) addresses and the like. For example, one of the communication server 110, the advertising server 112, a communication service billing server (not shown) having account information associated with the clients, or a module, included in the client, may determine the physical location associated with a target computer (receiving the telephone call) IP address.

The signaled client/participant(s) may participate in the program as well by responding to a prompt provided at inception of the digital audio session. For example, if the second client 104 sends an affirmative response, the communication server 110 may join the advertising server 112, via a SIP invite, in the first client 102/second client 104 digital audio session. In additional instances, if the second participant is enrolled in the advertising scheme the digital audio session may be analyzed.

In some implementations, a directory service module 114 may include an identity associated with a participant or client. For example, if a participant has more than one client identity (i.e., personal, work, work manager, etc.), the identity may be selected for a communication session based on a variety of factors. For example, the directory service module 114 may include identities "1" 116 through "N" 118. In one embodiment, if the participant is communicating during working hours, the work identity may be used, while if the digital audio session is occurring during a weekend, a personal identity may be implemented. For example, a collaboration server 120 (such as Microsoft Exchange Server, Microsoft Corporation, Redmond, Wash.) may retrieve client identities from a directory service module 114. The directory services module may be included in the collaboration server or in another computing device. For example, the client identities may be stored in a Microsoft Active Directory server (Microsoft Corporation, Redmond, Wash.). Additional factors to consider when determining a client identity may include participant history, client location, other participant information, content (of the utterance/the third party advertisement) and so on. For example, the identity may include context data, such as information which would aid in determining that at work the term "exchange" relates to a environment for trading securities (e.g., stock, bonds), while the personal identity may indicate another meaning. Similar techniques/hardware/software may address situations in which the target client, or recipient, participates in an advertising program. For example, the contacted party may participate in an advertising program, but the caller may not.

During a digital audio session, the audio content streams may be analyzed. For example, a recognition module (such as recognition module 122 in the first client 102) may identify words or utterances using speech recognition algorithm which converts the digital audio data into computer recognizable data. In some embodiments, all or a portion of the recognition module may reside on a network server such 110, 112, or 120. In an example, the recognition module 122 may identify the term "truck" in the digital audio session, and generate the corresponding Unicode text (or any other suitable computer recognizable data) equivalent of "truck" for comparison with the database 124. In this way, an utterance (word, phrase, phoneme, etc.) may be compared with a database 124 including utterances, pre-selected words (e.g. "sponsored" words in the database 124 that trigger advertisement forwarding), phrases, combinations of words, particular meanings and so on for determining associated advertisements.

The recognition module 122 may sample utterances at set intervals, throughout the digital audio session and so on. For example, the recognition module may use a speech recognition algorithm which samples audio data when a particular client is providing audio, sample at intervals, sample throughout the digital audio event, sample at intervals until a "sponsored" term, or a term included in a database 124 is identified at which point the speech recognition is applied for a period of time (or until a decision is reached as to the applicability of the term) and the like. In this manner, the served advertising may be targeted based on the extraction of an utterance from the digital audio session. Participants may option in or option out of a particular participation level by accessing the recognition module 122 or a participant module 126 (discussed below). In other instances, a uniform participation level may be used.

In some implementations, the audio data packets may pass through an intermediate server which analyzes the conversation content. For example, the audio content may pass through a designated host including a recognition module, such as the advertising server 112 or other device passing digital audio session data. In implementations, a participating client may forward the advertising server 112 the data stream for audio data analysis. For instance, an individual client may forward the advertising server 112 the associated participant's portion of the audio content, and the like. In some implementations, the advertising server may host the digital audio session.

Figure 2:
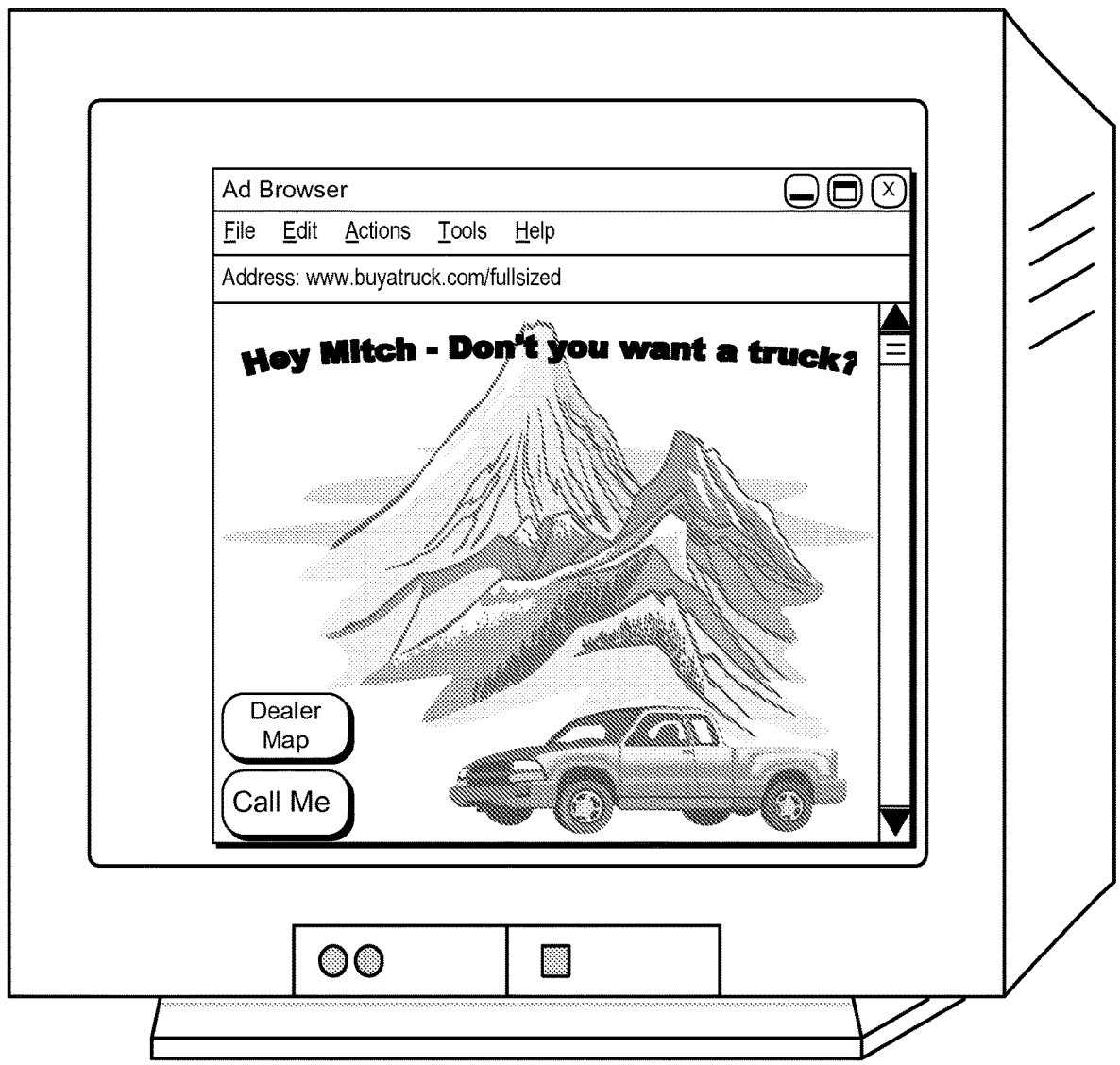
FIG. 2 is an illustration of an exemplary forwarded advertisement.

In the example in which the recognition module 122 has recognized the term "truck", the database 124 may be searched for the utterance, a word or an associated advertisement. For example, if the database 124 includes an advertisement which is associated with the term "truck", an advertising module 128 may forward to the client the advertisement from the database 124. For example, FIG. 2 provides a "pop-up" display on a client video. Additional associated information may be stored in the database 124 as well. The advertisement may be personalized or selected based on participant information. For example, the advertising module 128 may determine the participant's name based on a client identity included in the directory service, from an utterance in the digital audio session, or from communication service provider billing records, etc.

For instance, upon receiving the term "truck" from the recognition module 122, the advertising module 128 may determine that a participant having a specified income or credit level may receive a first advertisement for an entry level product, while a participant, with an income or credit level higher than the first participant, may receive a second advertisement for an upgraded product. The advertisements may be delivered in various ways such as a streaming audio or multimedia file, a voice mail, an email, a webpage presented on a client or associated display, etc. In some embodiments, the first client may receive a video solicitation while the second may receive a telephone call.

Examples of information associated with pre-selected utterances may include, but are not limited to, an assessed fee (for example a base fee), advertiser identification, target participant factors and so on. Additional advertisements may be included in the database 124. For example, a second advertisement may be forwarded based on participant information, additional utterances or other factors. For example, if participants speak for awhile about cars one advertisement may be selected (or an indication is given that the conversation may focus on a certain topic, such as cars) while if the conversation only briefly discusses the term a second, perhaps shorter advertisement may be forwarded. Participant information and other factors (such as time, device location, the party making the utterance and the like) may be taken into account. Participant information may be obtained from a client identity, entered data, data from previous digital audio sessions, data from reporting services, data from non-audio communications (such as an email or IM triggering a digital audio session), and the like. For example, an utterance record associated with an utterance or word may include one or more advertisements, advertiser identification, an assessed fee, secondary factors and so on. In some embodiments, the advertiser pays for each presentation of his advertisement.

Secondary factors may include multipliers for determining the advertising fee based on data associated with the digital audio session (utterance data, participant data, other digital audio session data). For example, a higher fee or lower fee may be calculated based on one or more of the time of day, participant income level, if the third party's trademark is uttered and so on. Exemplary factors may include, but are not limited to, location, time, relevancy factor, another sampled word, participant profile, participant selected advertisement level, non-audio communication triggering the digital audio event, participant advertisement interaction, number of participants, client bandwidth, client type, and the like.

For example, using client location as a factor, an advertisement may appear in regions in which the third party advertising provider, or sponsor, conducts business while other third party advertisements may appear in other regions. In this way, potential recipients may be more accurately targeted in comparison to techniques which do not differentiate based on the selected factor or factors. Correspondingly, the audio service provider may assess a premium for targeting a particular demographic segment. In implementations, multiple third parties may use similar criteria but for one or more determinative factors such as a region, a socioeconomic group and so on. In further examples, the advertising server may forward multiple advertisements. For example, a client may receive both a video pop-up advertisement and a telephone call.

Suitable advertisements may include, but are not limited to, video display, real-time video display, instant messaging, email messaging, voice mail messaging, Internet link, subsequent telephone call, subsequent offer to place a communication, physical messaging and the like. While non-intrusive media formats are discussed, in some implementations, clients may receive audible advertisements. For instance, an audio advertisement may be played at the end of an audio session or if one party puts the other on hold.

Data associated with the digital audio event may be stored in a database. For instance, if a participant permits data retention, the advertising module 128 may store utterance data, including participant information (identifiable or not) or other information, for analysis. A dedicated database may be included for storing digital audio session data. For example, a participant may be incentivized to permit data storage. In some instances, the advertising module 128 may remove identifying information. For example, while participant information may include a telephone number and physical address, when stored, the telephone number may be reduced to the area code and prefix. In a similar manner, the address may be reduced to a zip code plus a four digit postal identifier rather than the street address. In other instances, while identifiable data may be stored, the data may be automatically removed after a specified time.

In further implementations, the advertising module 128 may collect and/or determine billing information. For example, the advertising module 128 may collect utterance data (such as words, combinations of words associated with the pre-selected word), participant information (such as non-identifying information) and so on for adjusting a fee rate. Thus, the fee assessed to the third party may be calculated and entered into billing records. The billing information may be correlated with the underlying digital audio event data for confirmation. Thus, if a base fee is increased by a set factor because a participant interacted with the advertising or forwarded the advertisement, the advertising module 128 may calculate the assessed fee and store relevant data. In some embodiments, advertisers may bid on keywords in real-time via a keyword auction application or server, thus a particular keyword may not be associated in the database with a predetermined advertisement in every case.

Referring to FIGS. 1 and 3 a data module 130 may be included in the advertising server 112. The data module 130 may manage digital audio session data. For example, digital audio session data may include utterance data, participant information, or other digital audio session information. For example, the data module 130 may present a data user interface (generally FIG. 3, 300) updated with digital audio session data stored in an associated database 124. In some instances, data module 130 may assess a fee based on a user accessed data level. For example, while basic information (such as the number of times the advertisement was forwarded, the duration of the session) may be presented for free, the data module 130 may assess a fee for access to other data. For example, a fee may be charged based on the number of times a user accessed the data module 130, the level of information accessed, the duration of access, accessing additional records and so on.

In implementations, third parties may upload advertisements via the data module 130 and associated user interface (such as via webpage), vary secondary factors (income level, etc.), bid on available terms, make an offer for an utterance or word to be included in the database 124, manage assessed fees and the like. For example, if a third party is introducing a new product called the "X450", the third party may make an unsolicited offer via the online user interface to provide advertisements.

Referring to FIGS. 1 and 4, a participant module 126 may be included in the advertising server 112 for managing participant settings and information. For example, the participant module may present a webpage or other user interface for participant access. For example, the webpage (FIG. 4, 400) may include a user interface for defining/adjusting participation levels (a participation portion 402), monitoring incentives (an incentive portion 404) and so on. Thus, a participant permitting continuous access may be incentivized at a higher rate than a participant who only permits random sampling. A participant may vary the level at which he/she permits access, provide information regarding incentives and so on via the user interface, such as by accessing the advertising server. In implementations, a participant may vary the participation level via the recognition module 122 which may be updated with the participant module 126.

Communication between components may be sent via dedicated links, a network 132, such as, local area networks, wide area networks, public networks, wireless networks and the like as desired. For example, the various components may be connected by the World Wide Web, or the Internet.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable media, memory devices, e.g., memory. The module may be formed as hardware, software, a hybrid of hardware and software, firmware, stored in memory, as a set of computer readable instructions embodied in electronically readable media, etc. In other instances, components may be logically or physically combined.

Exemplary Procedures

The following discussion describes methodologies that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 5:
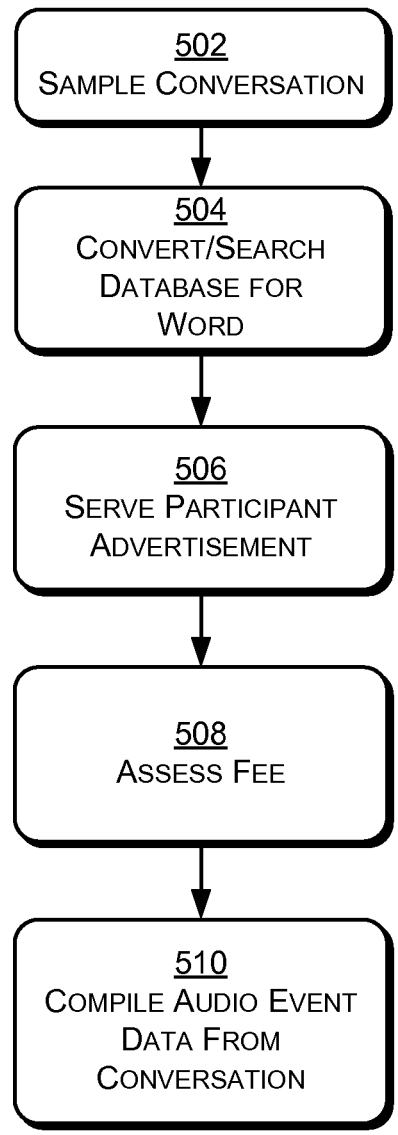
FIG. 5 is a flow diagram depicting a procedure in an exemplary implementation in which a digital audio conversation participant is served an advertisement associated with a word in the digital audio conversation.

Referring to FIG. 5, techniques for providing digital audio communications are discussed. For example, a third party may finance participant communication services, or other participant incentives, for the opportunity to serve advertisements to the participants. Third party financial support may be routed through an intermediary (such as a communication service provider) which in-turn provides participant incentives. Incentives may include, but are not limited to, free or reduced digital communication service, hardware, coupons, reimbursements, fungible credits or "reward points" and the like.

In some implementations, a digital audio event may be sampled 502 for words, phonemes, or utterances and the results compared to a database. For example, a recognition module using a speech recognition algorithm may sample one out of three words from a conversation between the clients for comparison with an advertising database including terms associated with advertisements. Other sampling techniques include, but are not limited to, set intervals, continuously throughout the digital audio event, at an intermittent interval until the inclusion of a term, sampling audio data packets, and the like.

Speech recognition software, implementing a speech recognition algorithm, may convert 504 the audio data into computer recognizable text and the keyword/advertisement database is searched for the word "truck", which may have one or more advertisements associated therewith. For example, the spoken word "truck", in an audio stream may be converted into Unicode text (computer understandable text) with the database searched for the word "truck" in Unicode text.

In some implementations, the audio data stream or the sampled word(s) may be buffered, so that, preceding portions of the audio event may be sampled upon the inclusion of a related word (i.e., backward sampling to provide context). For example, if an infrequently occurring word (in comparison with common word usage for a population) is included in the digital audio event, a portion of the audio data stream occurring before the relevant word may confirm if an advertisement should be served. For example, if a rarely used word is included in the conversation, such as "mesothelioma" (a cancer associated with asbestos), is sampled a preceding term (based on the timeline of the conversation) such as "removal" or "information" may trigger different advertisements. In the previous situation, inclusion of the term "removal" may trigger a solicitation for a local asbestos contractor, while inclusion of the term "information" may passively trigger a Center for Disease Control information video about mesothelioma type cancers.

An advertising server may serve 506 a cooperating participant, having previously agreed to receive advertisements, an advertisement, if the word sampled from the digital audio event is included in the database. For example, the advertisement may include information or may be a solicitation to purchase a good or service based on the passive inclusion of the word. For instance, if an auto maker sponsors the term "truck" or a combination of words (such as, "truck", "new" and "purchase"), one or more auto maker designated advertisements may be associated with the words in the database. The advertisement may be served in a non-intrusive (e.g., does not actively intrude on the conversation) medium. Non-intrusive medium examples may include one or more of video display, real-time video display, instant messaging, email messaging, voice mail messaging, Internet link, subsequent telephone call, subsequent offer to place a communication, physical messaging and so on. In other implementations, the advertisement may intrude on the digital audio event or intrude on a portion of the event (e.g., on the caller's side or the listener's and so on).

Thus, if the selected words are included in the digital audio event, a participant may receive the designated advertisement associated with the word or words in the database. For example, an advertising server may send "pop-up" video display for client display, may send a participant a physical piece of mail and so on if the sampled word matches a word in the database.

Other factors may be applied in determining if an advertisement is served, or determining which advertisement is served. Exemplary factors may include, but are not limited to, digital audio event related data including client data (whether participant specific or generalized into non-identifiable data), or data associated with the digital audio event (such as the time of day, the day and the like).

For example, a participant may be served a solicitation, including a redeemable coupon, if the term "pizza" is sampled in a digital audio event occurring before 3:00 p.m., while the same conversation occurring after 4:00 p.m. may be served with an offer to connect the participant to a local franchise location. In the same example, other factors may include if the call is placed to the participants home address, device location and so on.

Other representative factors may include, but are not limited to, participant location (for instance, what is the location of a global positioning enabled phone associated with the participant), time, event duration, relevancy factor, another sampled word, participant profile, participant selected advertisement level (does sampling occur at specified intervals, throughout the conversation, is data retention permitted), non-audio communication triggering the digital audio event (e.g., as the participant's spouse sent an instant message asking "[w]hat would you like for dinner?"), participant advertisement interaction, number of participants, bandwidth or device type.

In some implementations, a fee may be assessed 508 based on one or more of the above factors. For example, an advertising server may assess a higher fee for serving an advertisement based on digital audio event data in which the participant matches designated criteria. For instance, a higher fee may be assessed, if in addition to the inclusion of the sampled word, a participant mentions information included in the served advertisement, if the participant forwards the advertisement, if the participant resides in a designated location and so on. In some embodiments, a higher fee might be assessed if a recipient responds to the advertisement by "clicking through" or "voice through". In contrast, the fee may be lowered if criteria are not met. For example, the advertisement may reach a participant who is not in a specified demographic group. Other examples may include, but are not limited to, other words or utterances in the conversation, participant data, or other digital audio event data such as the advertisement that was served and the like. The assessed fee may be stored in a billing database or other database as desired.

In some implementations, the digital audio event data may be compiled 510 for storage. For example, non-identifiable conversation data may be stored for participants agreeing with this stipulation. In this example, digital audio event data may be stripped of information which may identify the particular participant, while general digital audio event data is retained. Examples may include, but are not limited to, retaining a participant zip code and postal route identifier, while removing the street address, storing a participant area code and prefix, while removing the last four digits in the telephone number.

In some instances, no digital audio event data may be removed, no digital audio event data may be retained, digital audio event data may be retained for a set period of time, only some digital audio event data may be retained and the like. Incentives may be tied with the participant designated data storage level. For example, a participant may receive an additional incentive if digital audio event data is stored in comparison to a participant permitting less data retention. Participants may be incentivized based on one or more of participant interaction with the advertisement, participant demographic factors and so on.

Web access may be provided for accessing digital audio event data. A data module include in the advertising server may permit access to digital audio event data. For example, a third party, financially supporting advertising, may access the digital audio event data via a user interface. While third parties may access general information as part of a sponsorship arrangement, the user interface and supporting infrastructure may assess fees based on the number of times data is accessed, the level of data accessed, the duration of access and the like as desired. For example, a third party not advertising with a digital audio service provider may access the compiled data by establishing an online account which determines fees in accordance with the above factors.

In further implementations, third party advertisement sources may be pre-selected in a bidding process. For instance, potential third party advertisers may bid, via the data user interface or an associated webpage, in an online environment for the opportunity to designate one or more advertisements associated with a word. In the previous example, the bidders may enter respective bids via a data webpage bidding interface or the like. In implementations, third parties may present un-solicited offers for words to be associated with an advertisement. For instance, an advertising server may accept third party offers via a user interface, such as a webpage. Thus, if a word is available [has not been pre-selected for association with another advertisement (e.g., "un-sponsored")], a third party may enter the word, indicate an advertisement to be served and may propose a base fee. In other implementations, more than one advertisement may be served in the same timeframe for example a first advertisement may be served in response to a word while a second advertisement may be served a second advertisement in a similar situation For example, two competitor advertisement may be alternately served (in separate digital audio events). Additionally, a higher fee may be charged, than a standard base fee, if a third party wishes to have exclusivity for a word. Keywords can also be apportioned to advertisers based on a participant's area code. Zip code, radius from a designated geographic location, jurisdiction, etc.

Participants may access account configuration parameters and incentive information via a webpage, a networked computer or other online type environment. A participant may adjust participation levels, data retention, sampling rates, the inclusion of personal data, served advertisement type and so on in a profile portion while an incentive portion may indicate earned incentives, exchangeable credits and the like.

Figure 6:
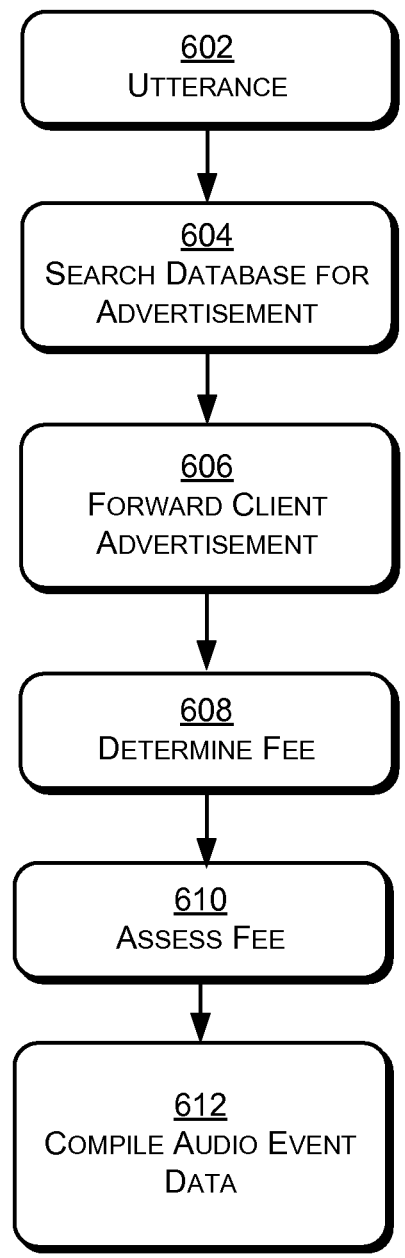
FIG. 6 is a flow diagram depicting a procedure in an exemplary implementation in which a client is forwarded an advertisement.

Referring to FIG. 6, forwarding advertising to client in response to an utterance in an audio event is discussed. For instance, the techniques discussed herein may present advertisements in response to passive inclusion of an utterance in a digital audio conversation having more than one participant. In this way, a client may receive information and/or solicitations, forwarded by an advertising server, for utterances made for another purpose (i.e., continuing the conversation/communicating with another participant). For example, an advertisement may be forwarded without participant directed interaction.

In response to receiving an indication if at least one utterance 602 in a digital audio event, a database may be searched 604 for advertisement(s) associated with the utterance. For instance, an advertising server may receive a Unicode or computer understandable i.e., capable of being processed and recognized as a word representation of an utterance obtained from a digital audio conversation communicated between a first client and a second client. For example, the utterance "truck" may be obtained from a VoIP session telephone call placed between communication session applications on two client computers (e.g, VoIP-enabled applications such as MSN Messenger, etc). An associated database may be searched 604 for advertisements which are associated with the utterance 602. For example, a third party supplied advertisement associated with the term "truck" may be stored in an advertising database. In another example, an information web link, such as to a third party webpage, may be stored in the database.

If an advertisement associated with the utterance is included in the database, the advertising server may forward 606 the advertisement to the client or another device associated with the client. For instance, the advertising server may forward a client a video advertisement for display on a monitor. The client may be configured to receive advertisements. For example, the client may allow "pop-up" video displays. Other factors may be used in determining whether to forward an advertisement to a client, or which advertisement from among more than one advertisement to forward to a client. For instance, the advertisement may be forwarded 606 if the client is located in a particular region. Thus, if the utterance "oil-change" is searched 604 and the first client is located with a designated state, city or postal zip code, the client may be forwarded 606 the advertisement, while a second client outside of the designated state or city may not receive the advertisement or may receive a different advertisement from a business near the second client.

A fee may be determined 608 for forwarding the advertisement. For example, an advertising server may determine 608 a fee based on the utterance, as well as, other factors. These other factors may include, for example, digital audio event data which may include one or more of utterance data, participant information, or other digital audio event information. Exemplary factors may include, but are not limited to, time, relevancy factor, another utterance, participant profile, selected advertisement level, non-audio communication triggering the digital audio event, participant advertisement interaction, number of participants, client bandwidth or client type. The third party sponsoring the advertisement may be assessed 610 the determined fee 608. For example, the determined fee and advertiser identification may be entered into a billing system or into a database for billing.

In implementations, participant incentives may be tied to similar factors. For instance, a participant may be awarded more "reward points" if the participant interacts with the advertisement, the participant forwards the advertisement, the extent to which the participant allows data collection and so on. For example, if a participant designates continual obtaining of audio data (and delivering to a device operating as discussed herein) the participant may earn more "reward points" than if intermittent searching were designated.

In further implementations, a user interface is generated. The user interface may include a profile portion for managing participant settings and an incentive portion for managing/accessing incentive information. For example, a participant may vary the extent to which the participant's conversations are monitored by manipulating a pull-down menu on a user interface. In other examples, a participant may redeem "reward points" by interacting with a button, included on the user interface hosted on webpage, designated for that purpose.

Correspondingly, a user interface, accessed in an online environment, may be generated for permitting digital audio event data access, bidding on the opportunity to sponsor utterances and to designate advertisements within the database, making offers to sponsor particular utterances and so on. For example, non-identifiable digital audio event data may be compiled 612 and stored. For instance, non-identifiable (data which does not identify a particular participant) digital audio event data may be stored for participants agreeing with this stipulation. For example, digital audio event data may be stripped of information which may identify the participant, while general digital audio event data is retained. In implementations, no digital audio event data may be removed, no digital audio event data may be retained, digital audio event data may be retained for a set period of time, only some digital audio event data may be retained and the like. A user interface may be generated for accessing the stored data. For example, a client location, type, participant profile, may be accessed via a webpage supported by an advertising server.

Although most examples focused on two-party communications, the disclosed innovations can also be used for multi-party communications such as conference calls and multi-cast calls (e.g., one talker being broadcast to many listeners). Similarly, although VoIP was primarily discussed as the means of voice communications, any suitable voice communication means may be used, whether digital or analog. Additionally, the disclosed innovations may be used with web-conferencing applications that transmit audio/video data between participants.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method for processing audio data, the computer-implemented method comprising:
receiving, by a recognition module in a server, an audio conversation from a client device;
converting, by the recognition module, the audio conversation into text that is representative of the audio conversation;
sampling, by the recognition module, the text for a word;
buffering, by the recognition module, at least a portion of the text during the sampling;
searching, by a content module in the server, in a database for a piece of content that is associated with the word, the searching including a backward sampling, wherein the backward sampling comprises:
identifying the word in the portion of the text, the word occurring at a first frequency that is less than a second frequency associated with a plurality of other words in conversations; and at least partly in response to identifying the word, looking for a relevant word in a segment of the portion of the text, wherein the segment of the portion precedes the word, and wherein detection of the relevant word in combination with the word triggers provisioning of the piece of content; and sending, by the content module, the provisioned piece of content to the client device.

2. The computer-implemented method as described in claim 1, further comprising pre-selecting a third party source of the piece of content from among one or more users in a network environment.

3. The computer-implemented method as described in claim 1, further comprising assessing a third party a fee for sending the provisioned piece of content to the client device, wherein the fee is dependent on a factor associated with one or more of user location, time, relevancy factor, at least one other word, user profile, user selected level associated with the piece of content, non-audio communication triggering the audio conversation, user interaction with the piece of content, number of users, bandwidth, or client device type.

4. The computer-implemented method as described in claim 1, further comprising determining the piece of content to be sent based on at least one of user location, time, relevancy factor, at least one other word, user profile, selected level associated with the piece of content, non-audio communication triggering the audio conversation, or client device type.

5. The computer-implemented method as described in claim 1, further comprising presenting a user interface for enabling a user to manage at least one of a level of participation in the audio conversation, an amount of data to be retained in association with the audio conversation, a format for providing pieces of content, an identity of the user, or a sample rate for the audio conversation.

6. The computer-implemented method as described in claim 1, further comprising providing a user an incentive selected from one or more of a service, a communication hardware device, a coupon, a reimbursement, or a fungible credit.

7. The computer-implemented method as described in claim 1, wherein sending the provisioned piece of content comprises sending the provisioned piece of content in a non-intrusive medium selected from one or more of video display, real-time video display, instant messaging, email messaging, voice mail messaging, Internet link, subsequent telephone call, subsequent offer to place a communication, or physical messaging.

8. The computer-implemented method as described in claim 1, further comprising compiling non-identifiable audio event data including the word associated with the piece of content and lacking data that identifies a user.

9. The computer-implemented method as described in claim 8, further comprising presenting a user interface for managing compiled audio event data.

10. The computer-implemented method as described in claim 1, further comprising accepting an unsolicited offer from a third party to designate the piece of content for words included in the database being searched.

11. One or more computer-readable storage media comprising computer-executable instructions that, when executed, direct a computing system to:

receive a portion of audio content from a client device;
convert the portion of the audio content into a computer recognizable representation of the portion of the audio content;

buffer at least a portion of the computer recognizable representation of the portion of the audio content to generate a buffered portion of the computer recognizable representation of the portion of the audio content;

identify a word in the buffered portion, the word occurring at a first frequency that is less than a second frequency associated with a plurality of other words in conversations;

at least partly in response to identifying the word, identify a relevant word in a segment of the buffered portion that precedes the word;

at least partly in response to identifying the relevant word, search a database for at least one piece of content that is associated with the word, the search locating the at least one piece of content;

in response to the search locating the at least one piece of content, send the at least one piece of content to the client device; and assess a third party a fee for sending the at least one piece of content.

12. The one or more computer-readable storage media as described in claim 11, the instructions further to direct the computing system to select the third party based on a bid entered by the third party in an online auction.

13. The one or more computer-readable storage media as described in claim 11, wherein the fee depends on a factor associated with one or more of client device location, time, relevancy factor, another utterance, user profile, selected level associated with the piece of content, non-audio communication triggering the audio content, user interaction with the piece of content, number of users, client device bandwidth, or client device type.

14. The one or more computer-readable storage media as described in claim 11, the instructions further to direct the computing system to compile non-identifiable audio event data comprising data that does not identify users associated with the audio content.

15. A system comprising:
one or more processors;
memory, communicatively coupled to the one or more processors, that stores:
a database including a record associating a pre-selected word with a piece of content, wherein the pre-selected word occurs at a first frequency that is less than a second frequency associated with a plurality of other words in conversations;
one or more modules that:
receive an audio session from a client device;
convert the audio session to a computer recognizable representation of the audio session;
identify, in a buffered portion of the computer recognizable representation of the audio session, a word that matches the pre-selected word;
upon identifying the word that matches the pre-selected word, identify another word that precedes the word in the buffered portion of the computer recognizable representation of the audio session; and
upon identifying the other word, send the piece of content to the client device based at least in part on one or more parameters.

16. The system as described in claim 15, wherein the one or more parameters are set by a user and individual parameters of the one or more parameters indicate at least one of a level of participation, a format in which to receive pieces of content, or whether or not information associated with the pieces of content is to be retained.

17. The system as described in claim 15, wherein the one or more modules calculate an assessed fee for sending the piece of content to the client device based at least in part on at least one of a location of a user, a time, a relevancy factor, an utterance, a profile of the user, a selected level associated with the piece of content, a non-audio communication triggering the audio session, user interaction with the piece of content, a number of users participating in the audio session, client device bandwidth, or client device type.

18. The system as described in claim 15, wherein the one or more modules send the piece of content to the client device based on at least one of user location, time, relevancy factor, user profile, selected level associated with the piece of content, non-audio communication triggering the audio conversation, or client device type.

19. The system as described in claim 15, wherein the one or more modules convert the audio session to the computer recognizable representation of the audio session based at least in part on performing at least one of speech recognition processing or speech-to-text processing on the audio session.

* * * * *